United States Patent [19]

Gay

[11] Patent Number: 5,722,032
[45] Date of Patent: Feb. 24, 1998

[54] AC GENERATOR ROTOR SEGMENT

[75] Inventor: David Earl Gay, Noblesville, Ind.

[73] Assignee: General Motors Corporation, Detroit, Mich.

[21] Appl. No.: 675,311

[22] Filed: Jul. 1, 1996

[51] Int. Cl.$^6$ ............................ B22F 3/12; B22F 5/08
[52] U.S. Cl. ............................ 419/6; 419/36; 419/38
[58] Field of Search .............................. 419/6, 36, 38

[56] References Cited

U.S. PATENT DOCUMENTS

| | | | |
|---|---|---|---|
| 3,973,153 | 8/1976 | Berney | 310/263 X |
| 4,255,494 | 3/1981 | Reen et al. | 428/551 |
| 4,543,208 | 9/1985 | Horie et al. | 252/62.54 |
| 4,588,915 | 5/1986 | Gold et al. | 310/194 |
| 5,004,577 | 4/1991 | Ward | 264/112 |
| 5,208,503 | 5/1993 | Hisey | 310/44 X |
| 5,221,503 | 6/1993 | Ward et al. | 264/126 X |
| 5,271,891 | 12/1993 | Gay et al. | 419/36 |
| 5,382,862 | 1/1995 | Ward et al. | 310/263 |
| 5,472,662 | 12/1995 | Yano et al. | 419/38 |
| 5,607,525 | 3/1997 | Gay | 156/62.8 |

OTHER PUBLICATIONS

U.S. Ser. No. 08/308,789 filed 19 Sep. 1994, AC Generator Rotor Segment, David E. Gay.

*Primary Examiner*—Charles T. Jordan
*Assistant Examiner*—Daniel Jenkins
*Attorney, Agent, or Firm*—Lawrence B. Plant

[57] ABSTRACT

Method of making pole segment for a Lundell-type AC generator rotor from a mixture of ferromagnetic particles and a fugitive binder where the teeth of the rotor are molded concurrently with the base of the rotor but from a mixture of particles which is different from the mixture used to mold the base. Thereafter the segment is fired to remove the binder and sinter the metal particles together.

11 Claims, 2 Drawing Sheets

AC GENERATOR ROTOR SEGMENT

FIELD OF THE INVENTION

This invention relates to a method of making end pole segments of an alternating current generator rotor of the Lundell-type wherein the base and teeth of the segments are simultaneously compacted from compositionally different ferromagnetic particles.

BACKGROUND OF THE INVENTION

Alternating current (AC) generators of the Lundell type are well known to those skilled in the art, and include a core of magnetic material supporting a field coil and a pair of end pole segments each having a plurality of teeth that extend axially from the circumference of the segments' base portion, and that interdigitate with the teeth of the other so as to encircle the coil. One such a rotor is disclosed in Gold et al., U.S. Pat. No. 4,588,915, wherein the pole end segments are formed from sheet steel material and the core is formed as a headed steel part. Another example of a Lundell-type rotor is disclosed in Ward et al. U.S. Pat. No. 5,382,862 issued Jan. 17, 1995 in the names of Ward et al. and assigned to the assignee of the present invention. Ward et al. U.S. Pat. No. 5,382,862 discloses a Lundell-type AC generator wherein the core and/or the end pole segments are formed from compacted and sintered ferromagnetic particles (i.e., iron and its alloys). More specifically in Ward et al., the magnetic components of the rotor are formed by coating iron particles having a particle size in a range of about 10 to 250 microns with a thermoplastic material, and then compacting, or pressing, them to the desired shape at a pressure of about 40 to 50 tons per square inch in a heated mold/die. The thermoplastic material acts as a lubricant during the compacting or pressing operation, and as a binder to temporarily hold the particles together in a "green" compact. The green compact is subsequently heated at a temperature of about 2050° F. to remove the binder and sinter the particles together into a cohesive mass.

Due to their complex shape, compacting of the end segments, as a single piece (i.e., compacting the base and teeth simultaneously as a single unit), often results in end segments which are not homogeneous, in that they have different densities of material at different locations within the segment. Typically, (1) the base (i.e., central) portion of the segment has densities of about 7.35 g/cc, (2) the teeth have densities which vary from about 7.2 g/cc at their roots to about 6.5 g/cc near their tip, and (3) the transition regions between the teeth and the base have the highest densities (i.e., greater than about 7.4 g/cc) as a result of higher pressures generated by the tooling in this region, and the coincident forging of the particles thereat. Large density gradients, between the base and the transition region, can cause cracking thereat and consequently weakening of the segment and distortion of the magnetic flux flow therein. Moreover, end segments whose teeth have a lower density than the base is undesirable as this can reduce and distort the flux-carrying capacity of the segment primarily at the teeth. Ideally, the teeth will have a substantially uniform density throughout and the highest flux-carrying capacity possible. High flux-carrying capacity can be achieved either by having high density teeth, or by making the teeth formed from ferromagnetic particles which have higher magnetic flux carrying capacity than the particles forming the base. Ideally, the teeth will have a density at least about equal to that of the base, and preferably as high as 7.5 g/cm$^3$.

My copending U.S. patent application 08/308,789, filed Sep. 19, 1994 and assigned to the assignee of the present invention, solves the aforesaid problems by compacting the base separately from the teeth, and subsequently joining them together. This permits molding the base and teeth portions individually to higher uniform densities than was possible when they were molded together. A disadvantage of my earlier process, however, is that multiple steps are needed to mold the base and teeth separately and then to join them together which adds to the complexity and the cost of the process.

BRIEF DESCRIPTION OF THE INVENTION

According to the present invention, the base and teeth of a Lundell-type rotor's pole end segments are simultaneously formed in the same compaction operation, but from different ferromagnetic particle mixes so as to provide teeth having a density at least about as great (preferably greater) as the base for improved magnetic performance. The invention contemplates a method of making an end pole segment of a Lundell-type AC generator rotor, which end segment is formed from sintered ferromagnetic particles (preferably iron and iron alloy particles), and comprises a base portion and a plurality of circumferentially spaced teeth extending axially from the circumference of the base portion. More specifically, the invention contemplates a method of making an end pole segment for such a rotor wherein the end pole segment comprises a base having a first density and a plurality of circumferentially spaced teeth extending axially from said base and having an average second density at least about as great as said first density.

A compression molding die is provided which has a molding cavity therein for shaping the pole segment, which cavity has first and second cavity portions for shaping the base and teeth, respectively. The first cavity portion (i.e., for the base) is filled with a first mixture of first ferromagnetic particles and a first fugitive binder for said first particles. The second cavity portions are filled with a second mixture of second ferromagnetic particles and a second fugitive binder for said second particles. The second mixture has a different composition than the first mixture and is adapted to produce teeth having an average second density at least about as great as the first density of the base when the two mixtures are simultaneously compression molded together in the molding cavity. The first and second mixtures are simultaneously compressed together in the molding cavity at a temperature and pressure sufficient to fuse the binders and temporarily bind the ferromagnetic particles together into a self-supporting compact upon cooling. Thereafter, the binders are removed from the compact, and the particles sintered together into a cohesive mass.

The average density of the teeth (i.e., averaged from tip-to-root) will be equal to at least about 97% of the density of the base, and preferably higher than the density of the base. For iron-based ferromagnetic particles, the teeth will most preferably have densities approaching 7.5 g/cm$^3$ in order to achieve as high a magnetic permeability in the teeth as possible for optimal flux-carrying capacity. High permeability can be effected not only by making the teeth more dense than the base, but also by changing the composition of the ferromagnetic particles themselves. Different lubricants and/or loadings thereof, different binders and/or loadings thereof as well as different particle sizes and shapes and combinations of the aforesaid may all be used to create different mixes. Moreover, the second ferromagnetic particles used to form the teeth, may be provided with different additives, or different amounts of the additives, to increase their flux-carrying capacity, strength or other properties. Hence for example for iron-based ferromagnetic particles:

(1) small amounts (e.g., about 5% by weight) Ni or Co may be alloyed with the iron particles to improve their magnetic permeability; (2) small amounts (e.g., about 1% to about 2% by weight) of copper may be alloyed with the iron particles to improve the compressibility of the particles and the strength of the sintered product; and (3) small amounts (e.g., about 3% by weight) of $Fe_3P$ may be added to the mix to improve strength and permeability.

The base and teeth are compaction molded from ferromagnetic particles (e.g., iron powder) having a fugitive thermoplastic binder either blended therewith or coated thereon. The same or different fugitive binders, or different binder concentrations may be used with the base and the teeth in order to achieve the desired properties in the base and the teeth provided that the binders are sufficiently compatible that they will flow together upon heating or otherwise bond together upon cooling following compression molding of the particles. The molding pressures and temperatures used will vary with the composition of the binder(s).

DETAILED DESCRIPTION OF CERTAIN EMBODIMENTS OF THE INVENTION

The invention will better be understood when considered in the light of the following detailed description of certain specific embodiments thereof, which is provided hereafter in conjunction with the several figures in which.

Figure 1:
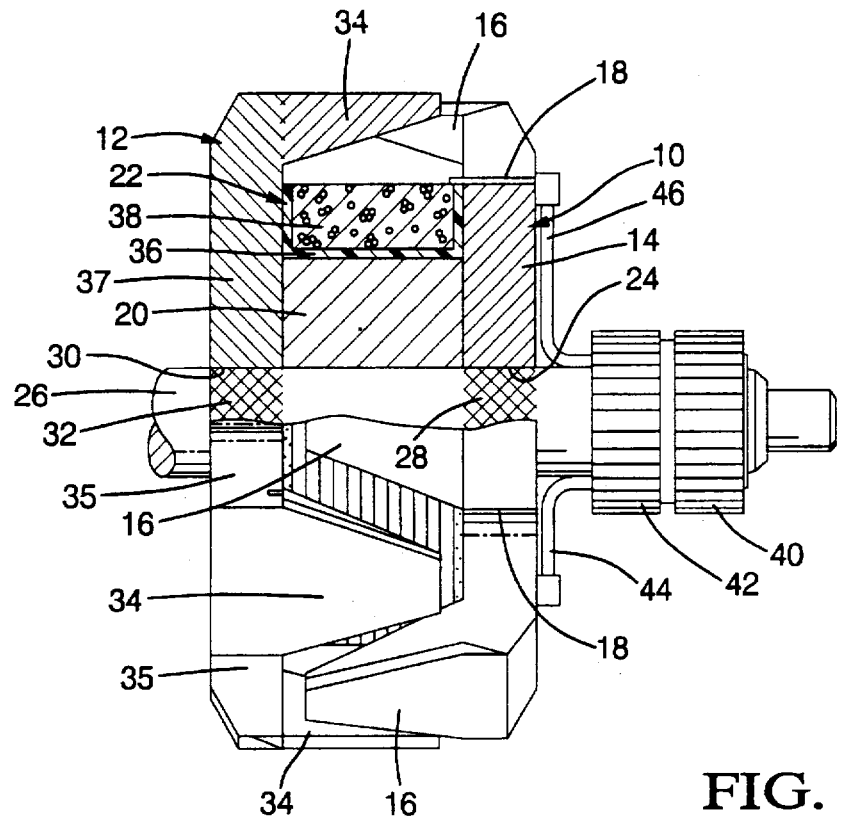
FIG. 1 is a side view, with parts broken away, of a Lundell-type rotor for an AC generator made in accordance with this invention.
Figure 2:
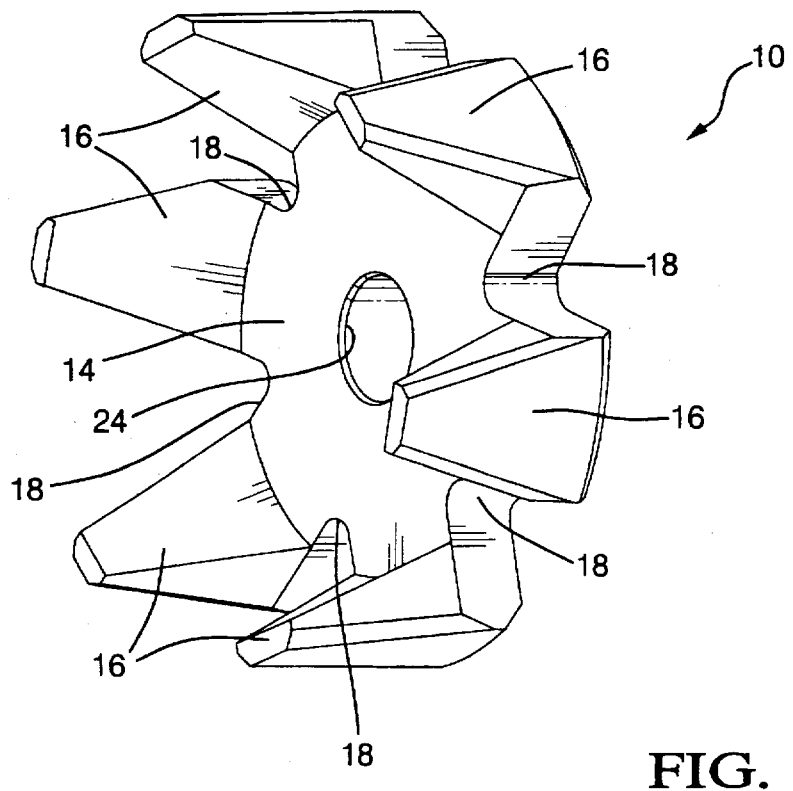
FIG. 2 is a perspective view of one of the end pole segments of the rotor shown in FIG. 1.

FIG. 1 illustrates a Lundell-type rotor for an AC generator. The rotor has two identical end pole segments 10 and 12 respectively. Segment 10 is shown in the exploded, perspective view of FIG. 2, and has a base portion 14, a central bore 24 therein, and six circumferentially spaced pole teeth 16 extending axially from the perimeter of the base portion 14. The teeth 16 are separated from each other by notches 18, and are compression molded at the same time as the base 14. The rotor has a cylindrical core portion 20 that extends between the end segments 10 and 12, and that carries a field coil 22 thereabout which, in turn, is encircled by the teeth 16 from the end segment 10. The field coil 22 assembly comprises a spool 36 that is formed of electrical insulating material and carries a field winding 38 comprising a plurality of turns of wire which serves to generate magnetic flux in the rotor as is well known in the art. The core 20 and pole end segments 10 and 12 form a magnetic circuit for carrying and appropriately concentrating the magnetic flux. The opposite ends of field winding 38 are electrically connected to metallic slip rings 40 and 42 by conductors 44 and 46. The slip rings 40 and 42 are carried by rotor shaft 26 and are electrically insulated from the shaft, and each other, in a manner known to those skilled in the art.

The bore 24 of segment 10 is secured to the shaft 26 by pressing it onto a knurled portion 28 formed thereon. Similarly, the segment 12 has a central bore 30 secured to shaft 26 by knurled portion 32. Like segment 10, the segment 12 has six circumferentially spaced pole teeth 34 that are separated by notches 35 and a base 37. The pole teeth 16 of end segment 10 are interdigitated with the pole teeth 34 of the end segment 12 (i.e., disposed between one another as shown in FIG. 1) so as to encircle the field coil 22.

The bases 14, 37 and teeth 16, 34 of the segments 10 and 12 are formed of small (i.e., about 10 microns to about 250 microns) iron, or iron alloy, particles mixed with suitable thermoplastic binders and molding lubricants. However, the base and the teeth will have different compositions in order to result in a pole segment whose teeth that are at least about as dense as (i.e., about 97% or more) the base when the base and teeth are compacted together in a single die molding cavity. Moreover, the composition of the teeth will be such as to achieve the maximum magnetic permeability and flux carrying capacity in the teeth as possible. The compositions of the base and teeth can be varied in a number of ways. For example, (1) the iron particle sizes and/or distribution can be changed for optimal packing, (2) the amount and/or composition of the fugitive binder and/or lubricant can be changed, (3) the mixture forming the teeth can be packed (e.g., by tamping or vibration) to a greater loose-particle density, prior to compaction than the base-forming particles, and (4) the composition of the iron particles for the teeth can be alloyed with alloyants such as copper (e.g., about 1% to 2% by weight) to make them more compressible. Moreover, the teeth can be made from iron alloyed with other metals which serve to increase their magnetic permeability. In this latter regard, a small amount of Ni or CO can be alloyed with the iron in the teeth to improve their flux-carrying ability.

By way of example, the iron powder particles used to make the base and teeth, may be a Hoeganaes 1000 B-PF iron powder which is blended with (1) a small amount (i.e., about 0.1% to about 1.0% by weight) of a fugitive thermoplastic binder, such as polyphenylene oxide (e.g., GE's Noryl), (2) a small amount (i.e., about 0.1% by weight) of a lubricant such as Carbowax®, and (3) a strengthener such as $Fe_3P$. The particle sizes of the iron particles range from about 10 microns to 250 microns with the majority of the particles being larger than about 44 microns. The iron alloy in this powder comprises about 99.7% Fe, 0.003% C, 0.0005% N, 0.006% S and 0.004% P. The amount of binder and/or lubricant may be different for the base and the teeth. Another useful material employs an unknown binder, and is sold by the Hoeganaes Corporation under the trade name ANCORDENSE®. This material is described in Semel U.S. Pat. No. 4,834,800 issued May 30, 1989 and assigned to the Hoeganaes Corporation. Hoeganaes 1000 C, or Hoeganaes SC 40 are likewise useful iron particles for both the bases and teeth when mixed with appropriate lubricants and binders.

Alternatively, the mixture to be compacted/sintered may comprise iron particles which have previously been coated with a fugitive binder (e.g., polyphenylene oxide) such as described in U.S. Pat. No. 5,271,891, issued Dec. 21, 1993 in the names of D. E. Gay et al, and assigned to the assignee of the present invention. One way of coating the particles is to dissolve the thermoplastic in a solvent to form a solution thereof. The iron particles are then blown upwardly through a vertical tube while, at the same time, the binder solution is sprayed into the tube to coat the particles. The solvent evaporates leaving the thermoplastic binder on the surface of the particles. The coated particles fall outside of the tube, and are repeatedly recirculated upwardly through the tube where they are coated again and again until a desired thickness of binder is achieved.

Figure 3:
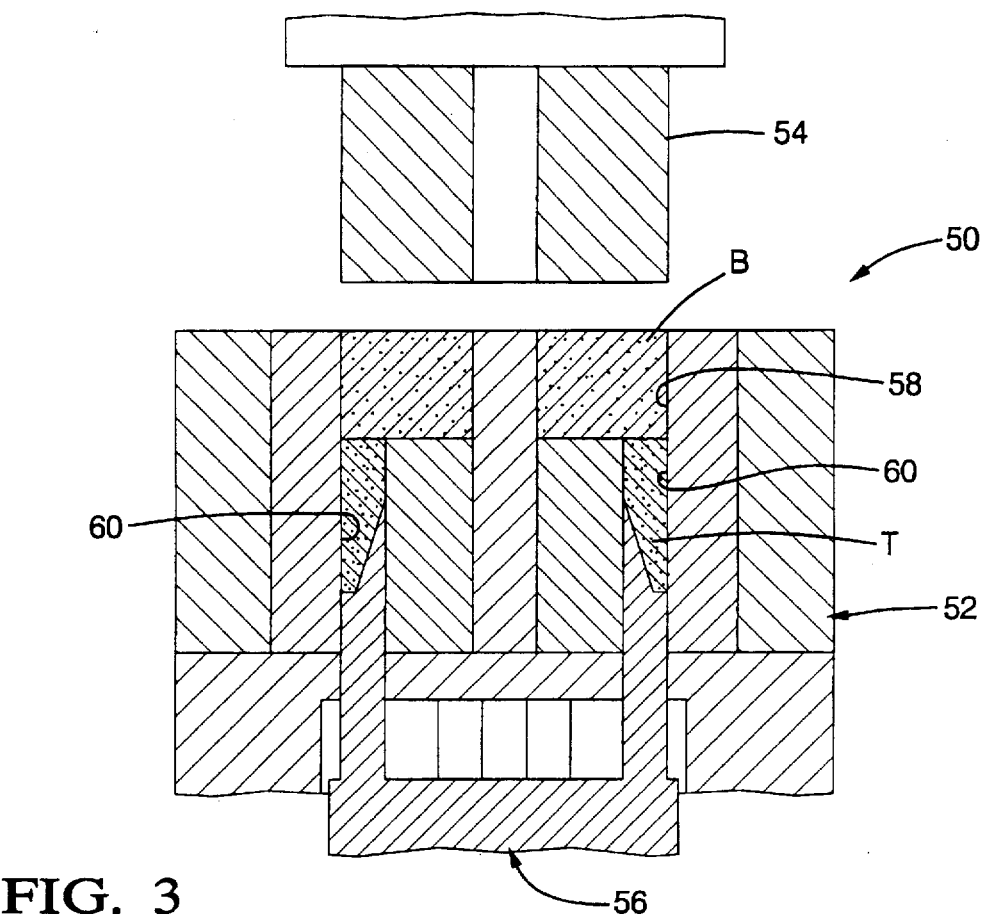
FIGS. 3 and 4 are side sectioned views of compression molding dies in the open (i.e., filling) and closed (i.e., pressing) positions illustrating the molding of the pole segments in accordance with the present invention.
Figure 4:
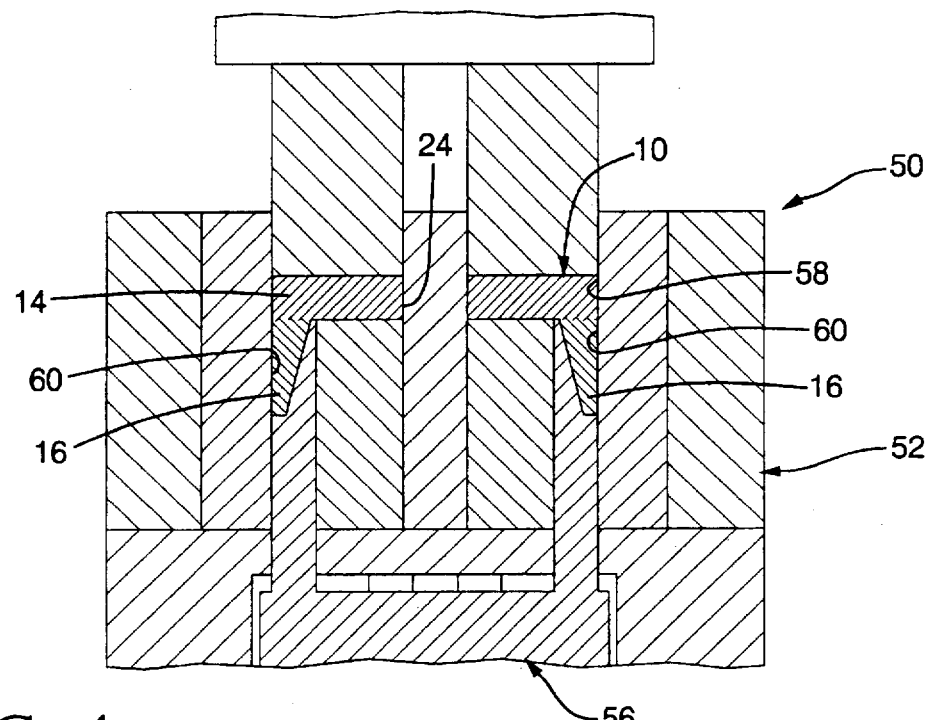

In accordance with the present invention, and as illustrated in FIGS. 3 and 4, there is provided a compression-molding die 50 comprising a multi-part stationary portion 52, and movable base-forming and teeth-forming punches 54 and 56 respectively. The stationary portion 52 defines a first base-forming cavity portion 58 and a plurality (e.g., six) second, teeth-forming, cavity portions 60. A quantity of a teeth-forming second mixture of binder-containing iron powder T is fed into the second, teeth-forming, portions 60. Thereafter a quantity of a base-forming first mixture of binder-containing iron particles B is fed into the first, base-forming, cavity portion 58. When polyphenylene oxide binders are used, the iron particle mixes are preheated to about 290° F. before being introduced into their respective die cavities. The die itself is preferably preheated to about 550° F. When other binders are used, different mix and die temperatures are required, depending on the thermoplastic used. Hence, for example, when ANCHORDENSE® particles are used the mold is only heated to about 350° F. The particles are compressed in the die at a pressure of about 50 to 55 tons per square inch by advancing the punches 54 and 56 toward each other (see FIG. 4) to compress the particles mixes therebetween. Compressing lasts for about 6 to 12 seconds in order to obtain densities of at least 7.2 g/cc, for both the base portion and the teeth. Preferably, the teeth-forming mix will be such as to achieve a greater density than that attained in the base. Preferably, the base will have a density of at least about 7.4 g/cc and the teeth a density approaching 7.5 g/cc. During compaction molding, the thermoplastic operates as a lubricant and serves to increase the density of the molded base/tooth. Additional lubricants (e.g., ACRAWAX™) may also be added to one or both of the mixes. Upon cooling, the thermoplastic acts as a binder and serves to hold the particles together in the as-molded, "green" state.

Thereafter, the segment is heated to a temperature (e.g., about 2050° F.) which will vary with the composition of the particles, and will be held there for about 15 to 45 minutes to sinter the particles together into a cohesive mass of sintered iron particles devoid any residual binder or lubricant. The thermoplastic binder material and lubricant, if present, is burned-off prior to or during the sintering operation.

The resistivity and magnetics of the iron particles can be varied by alloying them with such alloyants as cobalt, nickel, silicon or graphite, and the compressibility of the particles can be altered by alloying them with about 1% to about 2% by weight copper. As-molded density can also be effected by the packing density of the loose particles with higher packed densities yielding higher as-molded densities. Vibrating the die during filling helps achieve higher packed densities. Moreover, optimal densities, at the same molding pressures, can be achieved by blending different size particles together, and by the choice of particles shapes. For example, as for particle size blends a single size particle will typically yield a packed density of about 64%. A bimodol distribution, however, comprising 15% by weight of a first size particle and 85% by weight of a second size particles seven times (7×) larger than the first size will yield a packed density of about 86%. Even higher packed densities are possible with trimodol distribution. For example, a trimodol distribution comprising 11% by weight of a first size particle, 14% by weight of a second size particle seven times (7×) larger than the first particle and 75% by weight of a third particle forty-nine times (49×) larger than the first particle yields a packed density of about 95%.

Particle shape also has an effect on packing density, in that the greater the surface roughness or shape irregularity the lower the packing density. With respect to shape, for example, the more spherical the particles the higher will be the packed density. By way of comparison, if all the particles are spherical (i.e., 100% roundness) a packed density of about 64% can be expected. If the particles have a roundness of only 50% a packed density of about 58% can be expected, and if the particles have only a 40% roundness a packed density of only about 52% packed density. Hence changing the particle shape and size distribution can effect the packed density of the loose particles. Higher packed densities yield higher as-molded densities with the same molding pressure (i.e., press tonnage), or yield the same as-molded density with lower press tonnage.

Higher binder concentration yield lower densities and magnetics, but higher strength and particle flowability/moldability. Hence when binder concentration is used as a density determining variable, the teeth will have a lower percentage binder and the base will have a higher percentage binder. The higher percentage binder in the base facilitates achieving adequate density in the transition area between the base and the teeth at the perimeter of the base where the powders must move around a corner in the die and therefore difficult to densify as easily as the teeth and the rest of the base. The binders that work best are materials with a lower molecular weight/lower melt viscosity, flow good, do not get tacky and burn out cleanly at a relatively low temperature. Suitable binders include:

Noryl (Polyethylene Oxide/Polystyrene) Polyphenylene Oxide Cellulosics
Ethyl Cellulose Cellulose Acetate-Butyrate Ethyl Cellulose
Polystyrene Polycarbonate Acrylates
Methyl Methacrylate Ethyl Acrylate
Waxes Epoxies Polyacetals Polyamides
Diethylene Triamine
Poly(alkylene carbonate)

Preferably no lubricant will be used. When lubricants are used, concentrations are generally quite low, and for the best lubricants densities appear to be about the same even as the lubricant concentration goes up. Suitable lubricants include graphite, stearates, Acrawax® and Carbowax®.

Another useful way to achieve higher density teeth is tamping of the particles in the tooth area of the die or vibrating the die when filling the tooth area. For example, when filling the tooth area of the die, excess powder is provided to overfill the teeth cavities. The die is then vibrated to densify the loose powders in the tooth cavities. The base cavity is then filled (but not vibrated) and the powders pressed in the normal manner.

SPECIFIC EXAMPLE

An end pole segment for the rotor of a Lundell-type AC generator is made from two different batches of material. The teeth are made from a bimodol mixture comprising 15%, by weight, Hoeganaes 1000C Fe powder having an average particle size of 30 microns, and 85% by weight spherical iron powder having an average particle size of 210 microns. The particles are coated with 0.25% by weight ANCORDENSE® binder, and 1% by weight copper powder and 2.25% by weight $Fe_3P$ added thereto. The base is made from Hoeganaes 1000C Fe powder coated with 0.5% ANCORDENSE® binder and mixed with 4% $Fe_3P$. The die is heated to 350° F., filled with powder preheated to about 175° F., and compressed with 55 tons per square inch on the tooth punch and 50 tons per square inch on the base punch.

While the invention has been disclosed primarily in terms of specific embodiments thereof, it is not intended to be limited thereto, but rather only to the extent set forth hereafter in the claims which follow.

What is claimed is:

1. A method of making an end pole segment for a rotor of an alternating current device, said end pole segment being formed from a plurality of ferromagnetic particles and comprising a base having a first density and a plurality of circumferentially spaced teeth extending from said base, comprising the steps of:

a. providing a compression molding die having a molding cavity therein for shaping said pole segment, said cavity having a first cavity portion for shaping said base and a plurality of second cavity portions communicating with said first cavity portion for shaping said teeth;

b. filling said first cavity portion to a first loose density with a first mixture of first ferromagnetic particles and a first fugitive binder for said first particles;

c. filling said second cavity portions to a second loose density with a second mixture of second ferromagnetic particles and a second fugitive binder for said second particles, said second mixture having a different composition than said first mixture and adapted to produce teeth having a second density at least as great as said first density when said mixtures are simultaneously compression molded together in said molding cavity;

d. simultaneously compressing said first and second mixtures in said molding cavity at a temperature and pressure sufficient to fuse said first and second fugitive binders and temporarily bind the ferromagnetic particles together into a self-supporting compact upon cooling;

e. removing said binders from said compact; and f. sintering said compacts to permanently bond said particles together into a cohesive mass.

2. A method according to claim 1 wherein said second ferromagnetic particles have a higher magnetic flux carrying capacity than said first ferromagnetic particles.

3. A method according to claim 1 wherein said second mixture comprises less second binder than said first mixture contains first binder.

4. A method according to claim 1 including the step of packing said second mixture in said second cavity portions to a second loose density that is greater than said first loose density of said first mixture in said first cavity portion.

5. A method according to claim 4 including the step of vibrating said die while filling said second cavity portion.

6. A method according to claim 4 including the step of tamping said second mixture in said second cavity portions.

7. A method according to claim 1 wherein said second ferromagnetic particles have a shape more favorable to higher packed densification than said first ferromagnetic particles.

8. A method according to claim 1 wherein said second ferromagnetic particles have a particle size distribution that is more favorable to higher packed densification than said first ferromagnetic particles.

9. A method according to claim 1 wherein said second ferromagnetic particles are more compressible than said first ferromagnetic particles.

10. A method according to claim 9 wherein said second ferromagnetic particles comprise iron alloyed with about 1% to about 2% by weight copper.

11. A method according to claim 1 wherein said second mixture comprises a chemically different binder than said first binder.

* * * * *